(12) United States Patent
Garcia Molina et al.

(10) Patent No.: US 12,440,142 B2
(45) Date of Patent: Oct. 14, 2025

(54) ELECTRODE CONFIGURATION TO RECORD EAR ELECTROENCEPHALOGRAM (EEG) DURING SLEEP AND WAKEFULNESS

(71) Applicant: KONINKLIJKE PHILIPS N.V., Eindhoven (NL)

(72) Inventors: Gary Nelson Garcia Molina, Madison, WI (US); James Edward Barber, Avon, OH (US); Boomika Kalyan, Pittsburgh, PA (US); Antonio Aquino, Harrison City, PA (US); Rebecca Lynn Blice, Akron, OH (US); Jason Grant Tilk, Cleveland Heights, OH (US); Vikki Nowak, Cleveland Heights, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1094 days.

(21) Appl. No.: 17/112,505

(22) Filed: Dec. 4, 2020

(65) Prior Publication Data
US 2021/0169391 A1   Jun. 10, 2021

Related U.S. Application Data

(60) Provisional application No. 62/945,507, filed on Dec. 9, 2019.

(51) Int. Cl.
*A61B 5/291* (2021.01)
*A61B 5/00* (2006.01)
(Continued)

(52) U.S. Cl.
CPC .............. *A61B 5/291* (2021.01); *A61B 5/251* (2021.01); *A61B 5/372* (2021.01); *A61B 5/6817* (2013.01);
(Continued)

(58) Field of Classification Search
CPC ......... A61B 5/291; A61B 5/251; A61B 5/372; A61B 5/6817; A61B 5/725; A61B 5/4806; A61B 2562/0209; A61B 2562/04
See application file for complete search history.

(56) References Cited

U.S. PATENT DOCUMENTS 9,408,552 B2    8/2016  Kidmose et al.
10,835,145 B1 *  11/2020  Prevoir ................ A61B 5/6817
(Continued)

FOREIGN PATENT DOCUMENTS

AU          667199 B        3/1996
CN       201617827 U       11/2010
(Continued)

OTHER PUBLICATIONS

Y. Alqurashi et al., "The Efficacy of In-Ear Electroencephalography ( EEG ) to Monitor Sleep Latency and the Impact of Sleep Deprivation," in Novel Diagnostic Approaches to SDB, 2016, p. 7596.

(Continued)

*Primary Examiner* — Adam Z Minchella
(74) *Attorney, Agent, or Firm* — Michael W. Haas

(57) ABSTRACT

An apparatus used in a method for generating an ear electroencephalogram (EEG) signal from an ear of a patient includes: a housing; a first electrode provided on a first portion of the housing received within an ear canal of the ear, such that the first electrode is disposed against a first surface of the ear canal to generate a first ear canal signal; a second electrode provided on a second portion of the housing structured to be received within a concha of the ear when the first portion is received within the ear canal, such that the second electrode is disposed against a surface of concha to generate a concha signal; and electronic circuitry provided within the housing, the electronic circuitry being structured and configured to generate a first in ear signal (Continued)

after receiving the first ear canal signal and the concha signal.

18 Claims, 6 Drawing Sheets

(51) Int. Cl.
*A61B 5/251* (2021.01)
*A61B 5/372* (2021.01)

(52) U.S. Cl.
CPC ............ *A61B 5/725* (2013.01); *A61B 5/4806* (2013.01); *A61B 2562/0209* (2013.01); *A61B 2562/04* (2013.01)

(56) References Cited

U.S. PATENT DOCUMENTS

| | | | | |
|---|---|---|---|---|
| 2003/0023183 | A1* | 1/2003 | Williams | A61B 5/412 600/544 |
| 2014/0171775 | A1 | 6/2014 | Kilsgaard et al. | |
| 2018/0055447 | A1* | 3/2018 | Boesen | A61B 5/0002 |
| 2018/0116514 | A1 | 5/2018 | Turner | |
| 2018/0279944 | A1* | 10/2018 | Aiston | A61B 5/486 |
| 2019/0192077 | A1* | 6/2019 | Kaiser | G06F 3/015 |
| 2019/0209038 | A1 | 7/2019 | Saab et al. | |
| 2019/0282119 | A1* | 9/2019 | Andersen | A61B 5/6815 |

FOREIGN PATENT DOCUMENTS

| | | |
|---|---|---|
| CN | 101502418 B | 5/2011 |
| CN | 109745043 A | 5/2019 |
| DK | 2571289 T3 | 5/2015 |
| EP | 2454892 B1 | 3/2015 |
| EP | 2483974 B1 | 6/2016 |
| EP | 3181041 A1 | 6/2017 |
| EP | 3189780 A1 | 7/2017 |
| KR | 2006007334 A | 1/2006 |
| KR | 1791038 B1 | 10/2017 |
| WO | 2018103861 A1 | 6/2018 |

OTHER PUBLICATIONS

Y. Alqurashi, T. Nakamura, J. Moss, M. Polkey, D. Mandic, and M. Morrell, "The efficacy of an in-ear electroencephalography sensor to measure non-rapid eye movement sleep in healthy participants overnight," in A Look to the Future of Sleep. Use of Novel Technologies and Software Analysis, 2019, No. Level 3.
T. Nakamura, Y. D. Alqurashi, M. J. Morrell, and D. P. Mandic, "Automatic detection of drowsiness using in-ear EEG," In International Joint Conference on Neural Networks (IJCNN), 2018, pp. 5569-5574.
A. Nguyen, R. Alqurashi, Z. Raghebi, F. Banaei-kashani, A. C. Halbower, and T. Vu, "A Lightweight and Inexpensive In-ear Sensing System for Automatic Whole-night Sleep Stage Monitoring," in GetMobile: Mobile Comput Commun, 2017, pp. 31-34.
D. Looney et al., "The in-the-ear recording concept: User-centered and wearable brain monitoring," IEEE Pulse, vol. 3, No. 6, pp. 32-42, 2012.
K. B. Mikkelsen, D. B. Villadsen, M. Otto, and p. Kidmose, "Automatic sleep staging using ear-EEG," Biomed. Eng. Online, vol. 16, No. 1, pp. 1-16, 2017.
International Search Report and Written Opinion, International Application No. PCT/EP2020/084563, Mailed on Mar. 5, 2021.
Kaveh, R. et al., "A wireless, multielectrode, user-generic ear EEG recording system", 2019, IEEE Biomedical Circuits and Systems Conference.

* cited by examiner

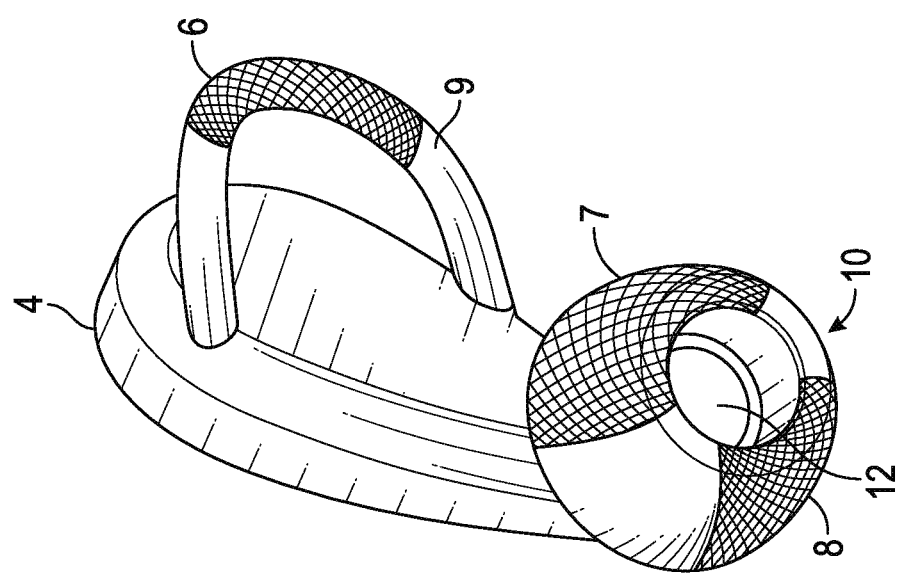
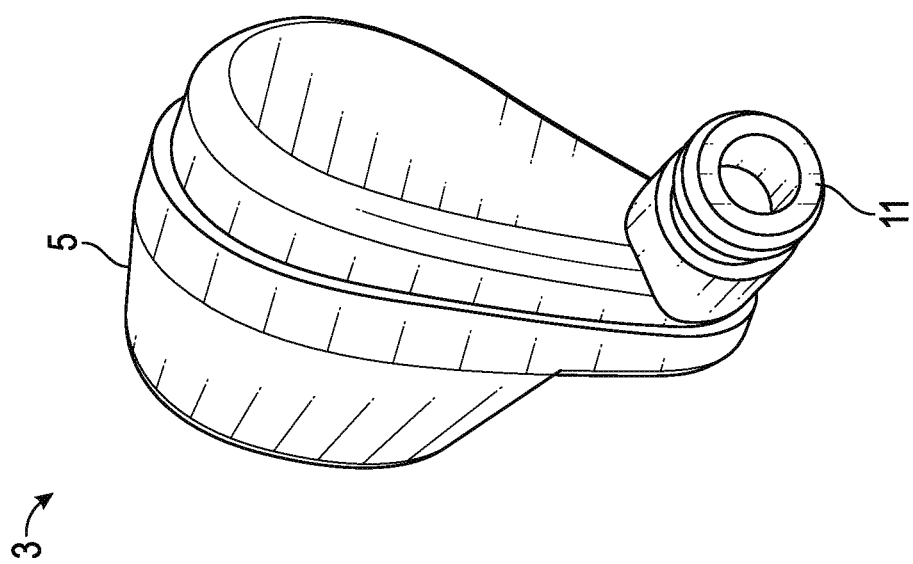

ELECTRODE CONFIGURATION TO RECORD EAR ELECTROENCEPHALOGRAM (EEG) DURING SLEEP AND WAKEFULNESS

CROSS-REFERENCE TO PRIOR APPLICATIONS

This application claims the benefit of U.S. Provisional Application No. 62/945,507, filed on 9 Dec. 2019. This application is hereby incorporated by reference herein.

BACKGROUND

1. Field

The present disclosure pertains to apparatuses and methods that generate and record ear electroencephalogram (EEG) signals from the ear of a patient.

2. Description of the Related Art

Measurement of sleep and wake EEG patterns enables several applications in the consumer context to facilitate falling asleep and staying asleep, sleep staging and coaching, and monitoring wakefulness to predict sleep architecture and sleep quality. Current methods of EEG monitoring include placing electrodes at various locations of the scalp, or within both ears with a galvanic connection between the in ear electrodes. EEG monitoring with these types of existing devices does not facilitate effective real-time frequent measurement of EEG signals while a patient is asleep. Thus, accuracy and volume of useful data will be improved by unobtrusive devices that improve patient comfort during sleep.

SUMMARY

Accordingly, one or more embodiments provide an apparatus configured to generate an EEG signal from an ear of a patient in a minimally obtrusive manner, based on a signal at the concha of the ear referenced to a signal from within the same ear canal. The apparatus comprises a housing, a first electrode provided on a first portion of the housing, a second electrode provided on a second portion of the housing, and electronic circuitry provided within the housing. The first electrode is structured to be received within an ear canal of an ear of the patient, and to be disposed against a first surface of the ear canal when the first portion of the housing is received within the ear for generating a first ear canal signal. The second electrode is structured to be received within a concha of the ear when the first portion is received within the ear canal, and to be disposed against a surface of concha when the second portion is received within the concha for generating a concha signal. The electronic circuitry is structured and configured to receive the first ear canal signal and the concha signal, and to generate a first in ear signal based on the first ear canal signal and the concha signal.

It is yet another aspect of one or more embodiments to provide a method of generating an EEG signal from an ear of a patient. The method comprises generating, by a first electrode disposed against a first surface of an ear canal of the patient, a first ear canal signal; generating, by a second electrode disposed against a surface of a concha of the patient, a concha signal; receiving, with electronic circuitry, the first ear canal signal and the concha signal; generating, with the electronic circuitry, a first in ear signal by referencing the concha signal to the first ear canal signal; and generating, with the electronic circuitry, the ear EEG signal based on at least the first in ear signal.

These and other aspects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits.

BRIEF DESCRIPTION OF THE DRAWINGS

FIGS. 2A-2B and 3A-3B illustrate exploded views of the left and right ear pieces illustrated in FIG. 1.

DETAILED DESCRIPTION OF EXEMPLARY EMBODIMENTS

Figure 1:
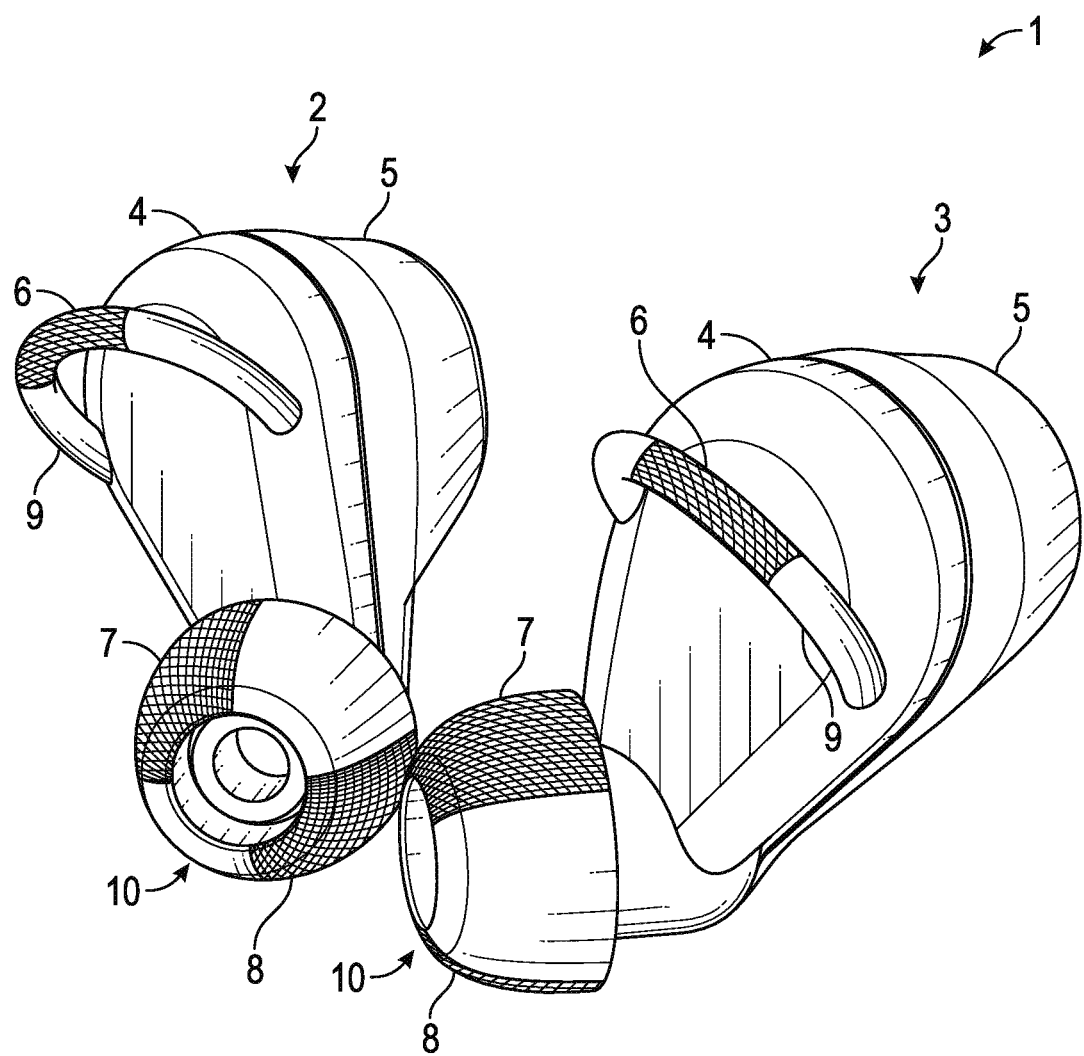
FIG. 1 is an isometric view of left and right ear pieces configured to generate an EEG signal from a patient according to an exemplary embodiment of the disclosed concept.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

FIG. 1 illustrates a pair of ear pieces 1, left ear piece 2 and right ear piece 3, each of which is configured to generate an EEG signal from an ear of a patient. Left ear piece 2 and right ear piece 3 contain identical components, but are shaped appropriately to fit securely within a left ear and a right ear, respectively. In some implementations, ear piece 1 is a unitary body while in other implementations, ear piece 1 is composed of separate components that can be combined securely to form one composite body. In one exemplary embodiment, ear piece 1 is composed of a cover 4 and an electronics casing 5, such that cover 4 and electronics casing 5 are separate components that snap together securely to form one composite body. FIG. 1 further illustrates a concha electrode 6, a superior canal electrode 7, and an inferior canal electrode 8 coupled to cover 4. In some implementations, electrodes 6, 7, 8 may be integrated into removable flexible coverings that can be affixed to and removed from concha piece 9 and canal piece 10, each forming respective parts of cover 4. In all implementations, cover 4 has concha electrode 6 affixed to it, and additionally has either one or both of superior canal electrode 7 and inferior canal electrode 8 affixed to it. Concha piece 9 is structured to fit securely within the concha of the ear of the patient and canal piece 10 is structured to fit securely within the ear canal of the patient, such that electrodes 6, 7, 8 are in sufficient contact with the concha, superior portion of the ear canal, and inferior portion of the ear canal, respectively, in order to measure an electrical signal at each of those portions of the ear with efficacy. A secure fit of concha piece 9 and canal piece 10 is crucial to ensure that ear piece 1 will remain in the ear while a patient is sleeping. Electronics casing 5 contains electronic circuitry (described in detail herein) which receives the raw signals measured by electrodes 6, 7, 8 coupled to cover 4.

Figure 2A:
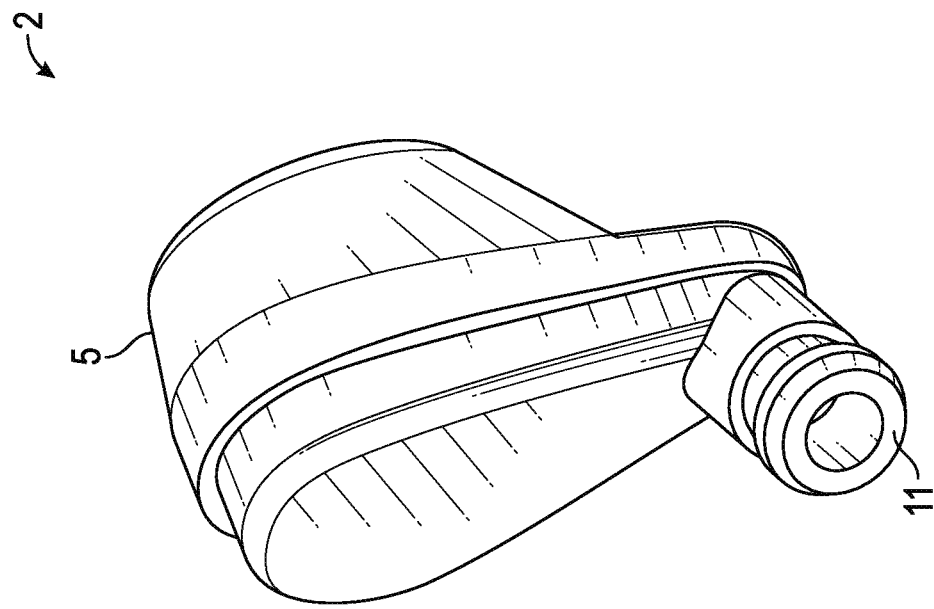
Figure 2A:
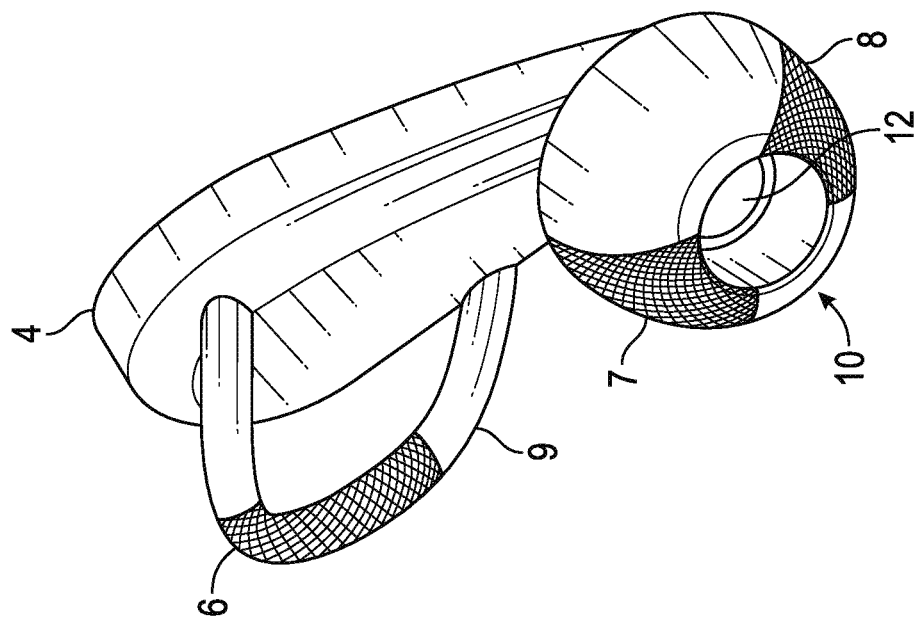
Figure 2B:
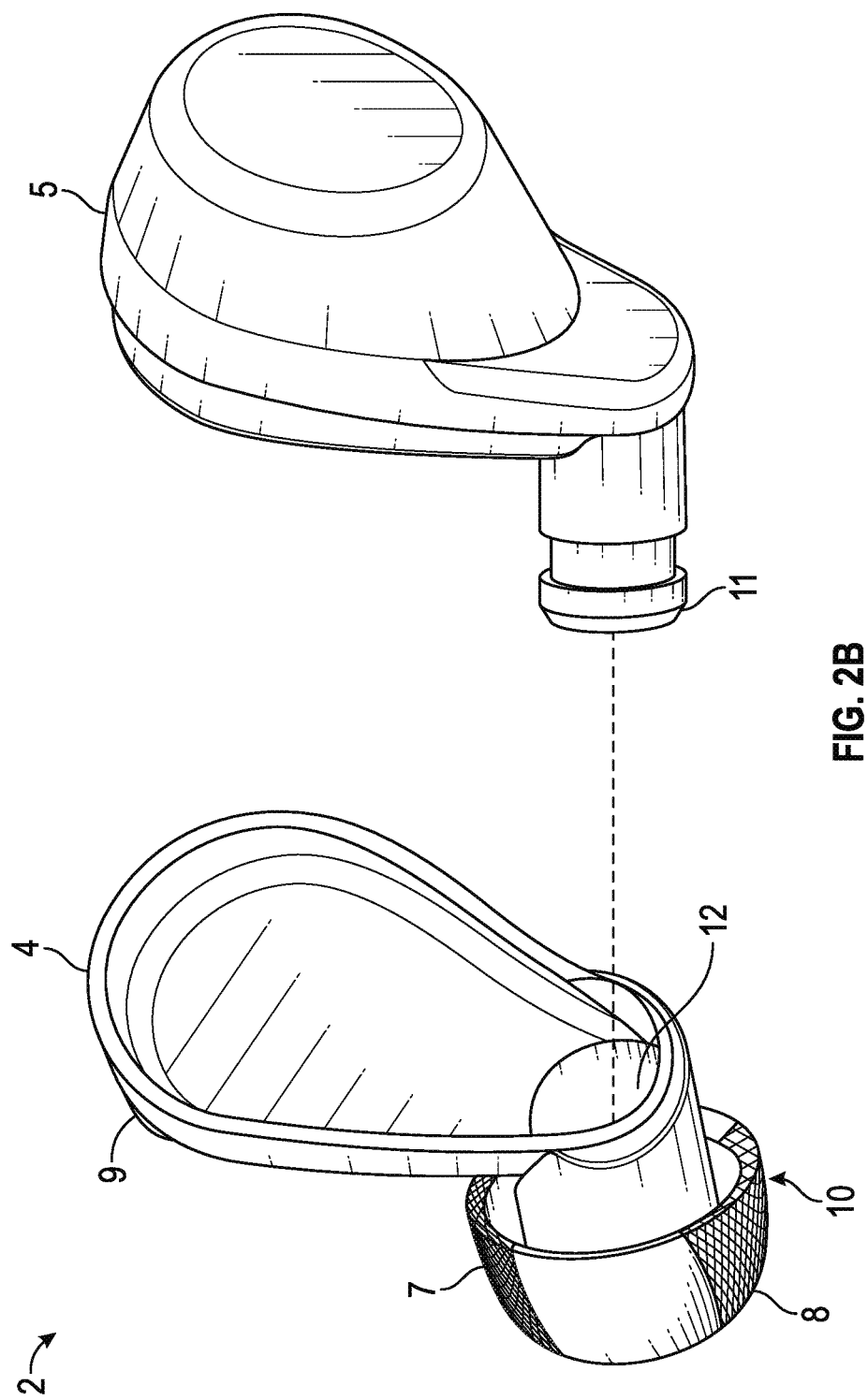
Figure 3B:
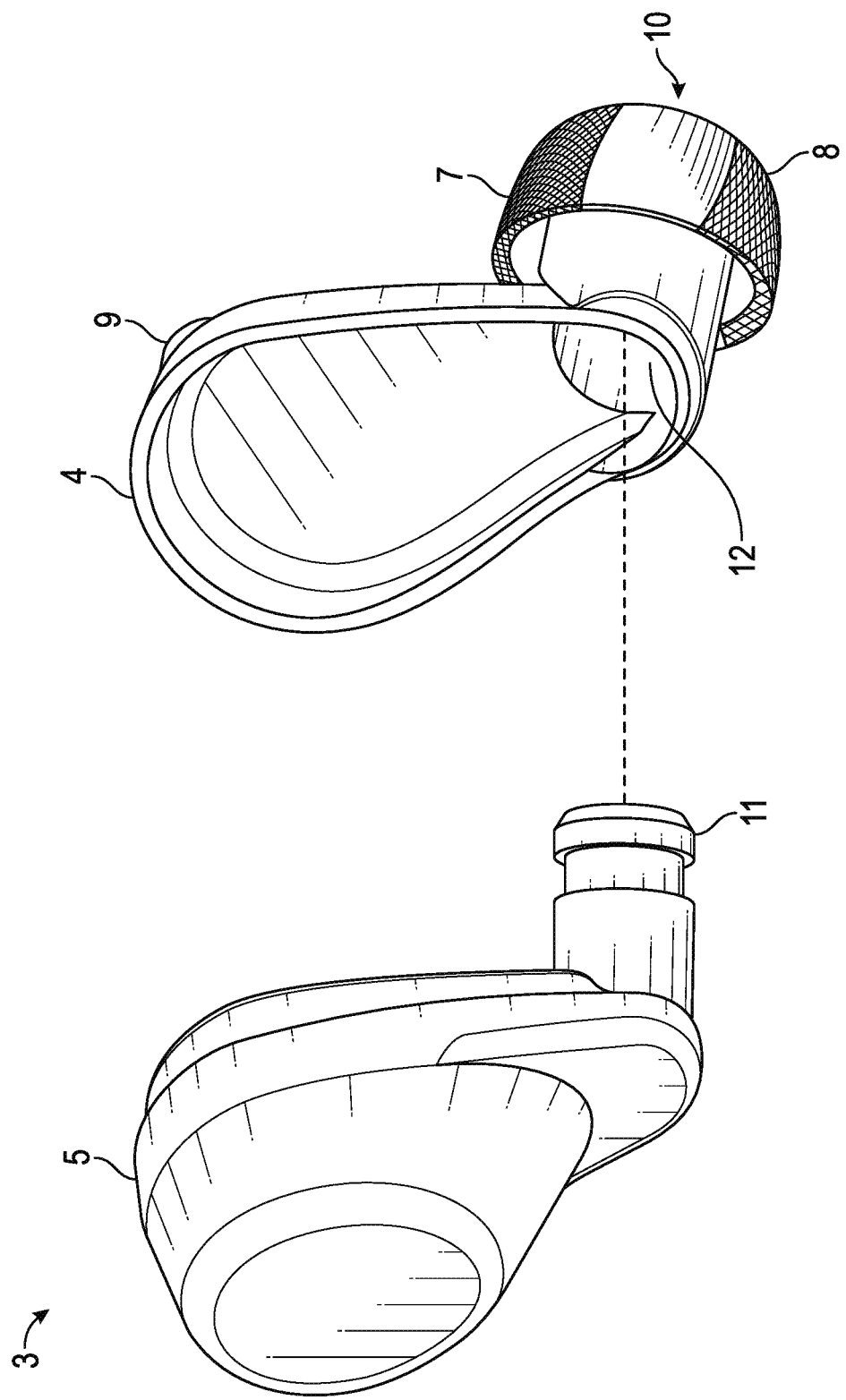

FIGS. 2A-2B show exploded views of left ear piece 2 where cover 4 and electronics casing 5 thereof are not coupled together, and FIGS. 3A-3B similarly show exploded views of right ear piece 3 where cover 4 and electronics casing 5 thereof are not coupled together. In the particular embodiments shown in FIGS. 2A-2B and 3A-3B, cover 4 and electronics casing 5 are structured to snap together; however, it will be appreciated that cover 4 and electronics casing 5 may be structured to be coupled to one another in a manner other than snapping together without departing from the scope of the disclosed concept. In FIGS. 2A-2B and 3A-3B, male component 11 is received within female component 12 when cover 4 and electronics casing 5 are snapped together. In one exemplary embodiment, producing cover 4 and electronics casing 5 separately allows a single electronics casing 5 to be snapped together with any of a number of different covers 4 having a concha piece 9 of varying sizes and a canal piece 10 of varying sizes, in order to produce a better fit within a patient's ear. In this exemplary embodiment, a standardized size electronics casing 5, male component 11, and female component 12 can be produced to streamline manufacturing processes, while only concha piece 9 and canal piece 10 would be produced with size variations.

Figure 4:
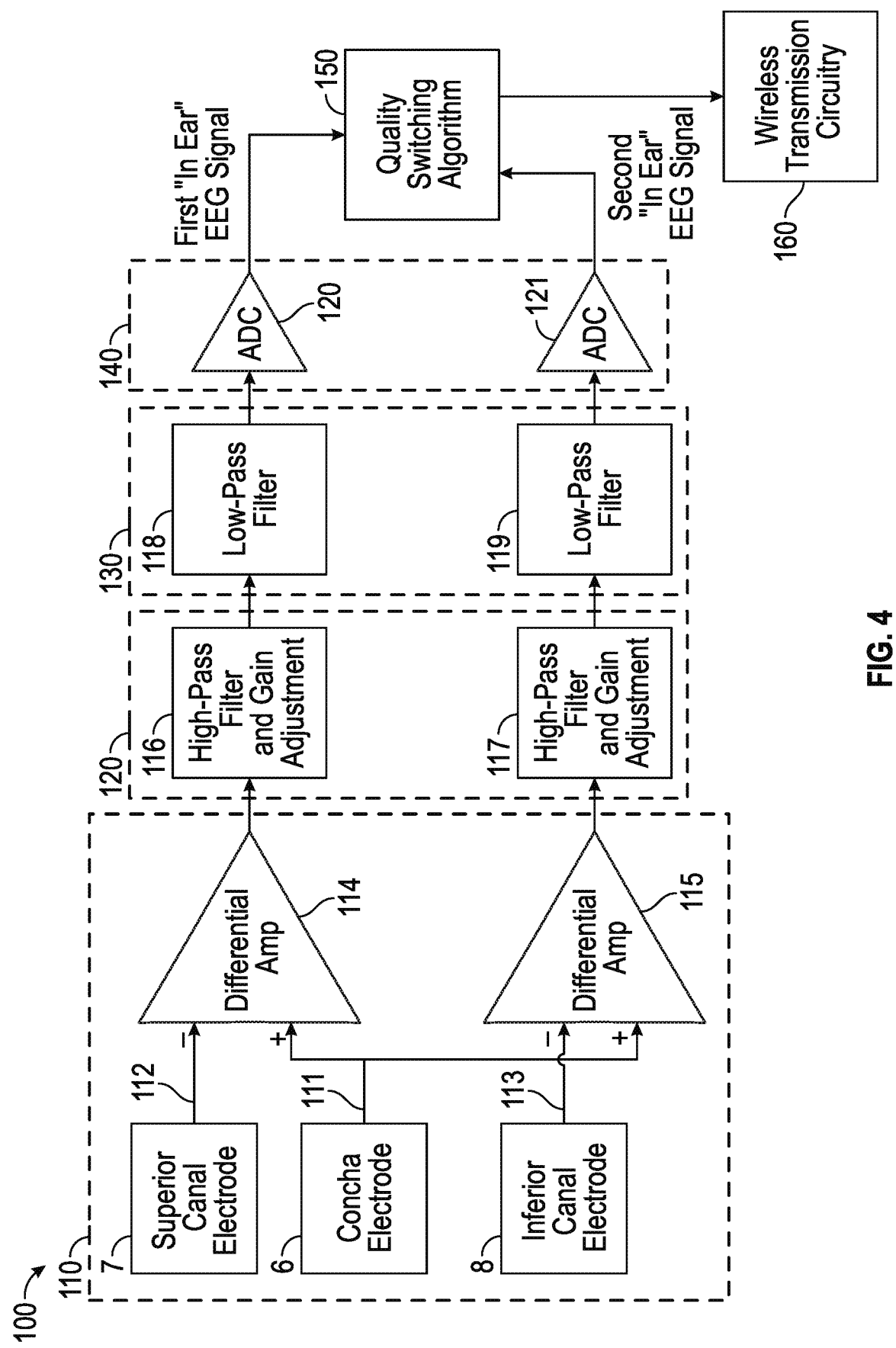
FIG. 4 is a schematic diagram of electronic circuitry for processing raw ear signals measured by the ear pieces in FIGS. 1-3 to produce an EEG signal and transmit the signal to, for example, a receiver for further processing according to an exemplary embodiment of the disclosed concept.

FIG. 4 illustrates an exemplary embodiment of electronic circuitry 100 for processing electrical signals measured by electrodes 6, 7, 8 to generate ear EEG signals from the ear of a patient. In one exemplary embodiment, electronic circuitry 100 may be implemented within one or more processing devices (e.g., an integrated processor, a digital processor, an analog processor, a digital circuit designed to process information, an analog circuit designed to process information, and/or other mechanisms for electronically processing information) contained within the electronics casing 5. Furthermore, electronic circuitry 100 is structured and configured to implement a method of processing electrical signals measured by electrodes 6, 7, 8 to generate the ear EEG signals as described in detail herein. Thus, the one or more processing devices electronic circuitry 100 may include one or more devices executing some or all of the operations of the method in response to instructions stored electronically on an electronic storage medium. The one or more processing devices may include one or more devices configured through hardware, firmware, and/or software to be specifically designed for execution of one or more of the operations of the described method.

The electronic circuitry 100 contained within electronics casing 5 is electrically connected to concha electrode 6, superior canal electrode 7, and inferior canal electrode 8 as shown schematically in FIG. 4. FIG. 4 also shows a concha signal 111 generated by concha electrode 6, a superior ear canal signal 112 generated by superior canal electrode 7, and an inferior ear canal signal 113 generated by inferior canal electrode 8. Signals 111, 112, 113 represent the raw electrical signals measured by electrodes 6, 7, 8 respectively. In a step performed by portion 110 of electronic circuitry 100, concha signal 111 is received both by a non-inverting input terminal of a first differential operational amplifier 114 and by a non-inverting input terminal of a second differential operational amplifier 115. Also in the step performed by portion 110 of electronic circuitry 100, superior ear canal signal 112 is received by an inverting input terminal of first differential operational amplifier 114, and inferior ear canal signal 113 is received by an inverting input terminal of second differential operational amplifier 115. Ear canal signals are known to be flat, electrically neutral signals. As such, ear canal signals 112, 113 are received at the inverting input terminals of differential operational amplifiers 114, 115 in order to act as reference signals for concha signal 111. At a step performed by portion 120 of electronic circuitry 100, the output signals of differential operational amplifiers 114, 115 are received as input signals to high pass filter and gain adjustment units 116, 117, respectively. At a step performed by portion 130 of electronic circuitry 100, the output signals of high pass filter and gain adjustment units 116, 117 are received as input signals to low pass filters 118, 119, respectively. It will be appreciated that high pass filtering, gain adjustment, and low pass filtering are used to eliminate unwanted noise from the output signals of differential operational amplifiers 114, 115, and that other modes or circuitry for eliminating signal noise may be employed without departing from the scope of the disclosed concept.

At a step performed by portion 140 of electronic circuitry 100, the output signals of low pass filters 118, 119 are digitized by analog to digital converters (ADC) 120, 121, respectively. ADC 120 outputs a digital first in ear EEG signal and ADC 121 outputs a digital second in ear EEG signal as shown in FIG. 4. It will be appreciated that digital signals may be preferable in certain contexts while analog signals may be preferable in other contexts, and that the method may be performed without step 140 without departing from the scope of the disclosed concept. In addition, while in the exemplary embodiment, the method performs the steps consecutively in the sequence described above, it will also be appreciated that, in an alternative exemplary embodiment, the step employing differential amplifiers 114 and 115 may be omitted without departing from the scope of the disclosed concept. In such an alternative embodiment, electronic circuitry 100 of electronics casing 5 would first high pass filter signals 111, 112, and 113 with high pass filter units 116, 117. Electronic circuitry 100 would next low pass filter signals 111, 112, and 113 with low pass filter units 118, 119. Electronic circuitry would then digitize the filtered signals 111, 112, and 113 with ADCs 120, 121. The first digitized in ear signal would be produced by subtracting digitized superior ear canal signal 112 from digitized concha signal 111, and the second digitized in ear signal would be produced by subtracting digitized inferior ear canal signal 113 from digitized concha signal 111.

Moreover, according to an aspect of the disclosed concept, the first and second in ear EEG signals are analyzed with a quality switching algorithm 150 implemented in electronic circuitry 100. Quality switching algorithm 150 determines which of the first in ear EEG signal and second in ear EEG signal is of better quality for outputting by electronic circuitry 100 (and thus the left ear piece 2 or the right ear piece 3, as the case may be) to another component, such as a separate EEG signal analysis processor. In the exemplary embodiment, the selected (i.e., better quality) in ear EEG signal is transmitted from left ear piece 2 or the right ear piece 3, as the case may be, by wireless transmission circuitry 160 forming a part of electronic circuitry 100. Wireless transmission circuitry 160 may be, for example and without limitation, a Bluetooth or WiFi module. It will be appreciated that other means of transmitting the selected EEG signal to the EEG signal analysis processor may be employed without departing from the scope of the disclosed concept.

In the exemplary embodiment, quality switching algorithm 150 estimates the root mean square (RMS) voltage of both digitized in ear EEG signals and then compares the RMS voltage of both digitized in ear EEG signals to a minimum voltage threshold and a maximum voltage threshold. For an in ear EEG signal to be of acceptable quality, it must have a RMS voltage above the minimum voltage threshold and below the maximum voltage threshold. For example and without limitation, a minimum voltage threshold of 60 µV and a maximum threshold of 150 µV may be implemented so that only in ear EEG signals with RMS voltage greater than or equal to 60 µV and less than or equal to 150 µV sustained over a six-second interval would be considered to be of acceptable quality. If only one of the digitized in ear EEG signals has a RMS voltage above the minimum voltage threshold and below the maximum voltage threshold, that in ear EEG signal will be transmitted as the EEG signal of electronics 100. If both digitized in ear EEG signals are of acceptable quality with a RMS voltage between the minimum voltage threshold and the maximum voltage threshold, only one of the digitized in ear EEG signals will be transmitted as the EEG signal to electronic circuitry 100. In the exemplary embodiment, it is intended that concha and ear canal electrical signals 111, 112, 113 would be continuously measured by electrodes 6, 7, 8. Accordingly, the quality switching algorithm continuously compares the digitized in ear signals that result from processing signals 111, 112, 113 with the method implemented by electronic circuitry 100. In the exemplary embodiment, the digitized in ear signal that was most recently transmitted by electronic circuitry 100 will continue to be transmitted by electronic circuitry 100 for as long as it remains of acceptable quality, even if the other in ear signal is of acceptable quality, in order to avoid discontinuity. It will be appreciated that, when both digitized in ear signals are of acceptable quality, either of the two signals may be transmitted by electronic circuitry 100 without departing from the scope of the disclosed concept. It will also be appreciated that the quality switching algorithm 150 could be implemented by a processor outside of ear piece 1 such that all of the digitized in ear signals resulting from the method described herein would be transmitted to such processor outside of ear piece 1, and the quality switching algorithm 150 would thereafter be performed, without departing from the scope of the disclosed concept.

In one exemplary embodiment, a patient would don both left ear piece 2 and right ear piece 3 simultaneously. It will be appreciated, therefore, that in this exemplary embodiment, two in ear signals would be produced from each ear simultaneously. In addition, in this exemplary embodiment, the quality switching algorithm 150 would be implemented separately from both left ear piece 2 and right ear piece 3, and would receive and compare four signals, i.e. the two digitized in ear signals from left ear piece 2 and the two digitized in ear signals from right ear piece 3, to determine which is of the highest quality for use by an EEG signal analysis processor.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although this description includes details for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that, to the extent possible, one or more features of any embodiment are contemplated to be combined with one or more features of any other embodiment.

The invention claimed is:

1. An apparatus for generating an ear electroencephalogram (EEG) signal from an ear of a patient, comprising:

a housing including a cover and an electronics casing, wherein the cover and the electronics casing are formed separately from another and both have a generally pear-shape, and are structured to be fit together to form a composite body, wherein the cover includes a first main body member defining a wide portion of the generally pear shape of the cover, and a female component connected to a narrow portion of the pear shape of the cover, wherein a first planar surface of the first main body member is transverse to a longitudinal axis of the female component, and wherein the electronic casing includes a second main body member defining a wide portion the general pear shape of the electronic casing, and a male component connected to a narrow portion of the pear shape of the electronic casing, wherein a second planar surface of the second main body member is transverse to a longitudinal axis of the male component, and wherein the male component is structured to be received within the female component when the cover and the electronics casing are fit together;

a first electrode provided on the female component, wherein the female component is structured to be received within an ear canal of the ear, and wherein the first electrode is structured to be disposed against a first surface of the ear canal when the female component is received within the ear canal for generating a first ear canal signal;

a loop member connected to the first planar surface such that the loop extends from the first planar surface is a direction that in generally the same direction that the second female component extends from the cover;

a second electrode provided on the loop member, wherein the loop member is structured to be received within a concha of the ear when the female component is received within the ear canal, and wherein the second electrode is structured to be disposed against a surface of the concha when the second portion is received within the concha for generating a concha signal; and electronic circuitry provided within the electronics casing, the electronic circuitry being structured and configured to receive the first ear canal signal and the concha signal and to generate a first in ear signal based on the first ear canal signal and the concha signal.

2. The apparatus according to claim 1, wherein the first in ear signal is generated by referencing the concha signal to the first ear canal signal.

3. The apparatus according to claim 2, wherein the electronic circuitry is structured and configured to generate the ear EEG signal by selecting between the first in ear signal and the second in ear signal.

4. The apparatus according to claim 3,
wherein the electronic circuitry is structured to implement a quality switching algorithm to determine which of the first in ear signal and the second in ear signal is of higher quality,
wherein the electronic circuitry is structured to transmit whichever of the first in ear signal and the second in ear signal is of higher quality as the ear EEG signal.

5. The apparatus according to claim 2,
wherein the electronic circuitry includes differential amplification circuitry, high pass and gain adjustment circuitry, low pass filter circuitry, and digitization circuitry,
wherein the differential amplification circuitry is structured to receive the first ear canal signal as a reference input signal and to receive the concha signal as a second input signal,
wherein the high pass filter and gain adjustment circuitry is structured to receive an output of the differential amplification circuitry,
wherein the low pass filter circuitry is structured to receive an output of the high pass and gain adjustment circuitry, and
wherein the digitization circuitry is structured to receive an output of the low pass filter circuitry and generate the first in ear signal based on the output of the low pass filter circuitry.

6. The apparatus according to claim 1, wherein the electronic circuitry is structured and configured to generate the ear EEG signal based on at least the first in ear signal.

7. The apparatus according to claim 1, further comprising a third electrode provided on the female component, wherein the third electrode is structured to be disposed against a second surface of the ear canal when the female component is received within the ear canal for generating a second ear canal signal, and wherein the electronic circuitry is structured and configured to receive the second ear canal signal and the concha signal and to generate a second in ear signal based on the second ear canal signal and the concha signal.

8. The apparatus according to claim 7, wherein the first in ear signal is generated by referencing the concha signal to the first ear canal signal, and wherein the second in ear signal is generated by referencing the concha signal to the second ear canal signal.

9. The apparatus according to claim 8,
wherein the electronic circuitry includes first differential amplification circuitry, first high pass and gain adjustment circuitry, first low pass filter circuitry, and digitization circuitry,
wherein the first differential amplification circuitry is structured to receive the first ear canal signal as a reference input signal and to receive the concha signal as a second input signal,
wherein the first high pass filter and gain adjustment circuitry is structured to receive an output of the first differential amplification circuitry,
wherein the first low pass filter circuitry is structured to receive an output of the first high pass and gain adjustment circuitry,
wherein the first digitization circuitry is structured to receive an output of the first low pass filter circuitry and generate the first in ear signal based on the output of the first low pass filter circuitry,
wherein the electronic circuitry includes second differential amplification circuitry, second high pass and gain adjustment circuitry, and second low pass filter circuitry,
wherein the second differential amplification circuitry is structured to receive the second ear canal signal as a reference input signal and to receive the concha signal as a second input signal,
wherein the second high pass filter and gain adjustment circuitry is structured to receive an output of the second differential amplification circuitry,
wherein the second low pass filter circuitry is structured to receive an output of the second high pass and gain adjustment circuitry, and
wherein the digitization circuitry is structured to receive an output of the second low pass filter circuitry and generate the second in ear signal based on the output of the second low pass filter circuitry.

10. The apparatus according to claim 7, wherein the third electrode is coupled to the female component so as to contact an inferior wall of the ear canal, and wherein the first electrode is coupled to the female component so as to contact a superior wall of the ear canal.

11. The apparatus according to claim 1, wherein the female component includes an in-ear component having a semi-ovoid shape, and wherein the in-ear component is structured to fit securely within the ear canal with a surface of the in-ear component disposed against a wall of the ear canal.

12. The apparatus according to claim 11, wherein the in-ear component comprises a flexible removable covering, and wherein the first and second electrodes are positioned on the flexible removable covering.

13. The apparatus according to claim 1, wherein the loop member forms a semi-circular loop structured to fit securely against the concha.

14. The apparatus according to claim 1, wherein the electronics casing is disposed so as to face away from a surface of the ear.

15. A method for generating an ear electroencephalogram (EEG) from an ear of a patient using an apparatus comprising: a housing including a cover and an electronics casing, wherein the cover and the electronics casing are formed separately from another and both have a generally pear-shape, and are structured to be fit together to form a composite body, wherein the cover includes a first main body member defining a wide portion of the generally pear shape of the cover, and a female component connected to a narrow portion of the pear shape of the cover, wherein a first planar surface of the first main body member is transverse to a longitudinal axis of the female component, and wherein the electronic casing includes a second main body member defining a wide portion the general pear shape of the electronic casing, and a male component connected to a narrow portion of the pear shape of the electronic casing, wherein a second planar surface of the second main body member is transverse to a longitudinal axis of the male component, and wherein the male component is structured to be received within the female component when the cover and the electronics casing are fit together;
- a first electrode provided on the female component, wherein the female component is structured to be received within an ear canal of the ear, and wherein the first electrode is structured to be disposed against a first surface of the ear canal when the female component is received within the ear canal for generating a first ear canal signal;
- a loop member connected to the first planar surface such that the loop extends from the first planar surface is a direction that is generally the same direction that the second female component extends from the cover;
- a second electrode provided on the loop member, wherein the loop member is structured to be received within a concha of the ear when the female component is received within the ear canal, and wherein the second electrode is structured to be disposed against a surface of the concha when the second portion is received within the concha for generating a concha signal; and
- electronic circuitry provided within the electronics casing, the electronic circuitry being structured and configured to receive the first ear canal signal and the concha signal and to generate a first in ear signal based on the first ear canal signal and the concha signal, the method comprising:
- generating, by a first electrode provided on the female component and disposed against a first surface of an ear canal of the patient, a first ear canal signal;
- generating, by a second electrode provided on a loop member connected to the first planar surface and disposed against a surface of a concha of the patient, a concha signal;
- receiving, with electronic circuitry provided in the electronic casing, the first ear canal signal and the concha signal;
- generating, with the electronic circuitry, a first in ear signal by referencing the concha signal to the first ear canal signal;
- generating, with the electronic circuitry, the ear EEG signal based on at least the first in ear signal.

16. The method of claim 15,
wherein the electronic circuitry includes at least first differential amplification circuitry, first high pass and gain adjustment circuitry, first low pass filter circuitry, and first digitization circuitry,
wherein the first ear canal signal is received as a reference input signal to the first differential amplification circuitry and the concha signal is received as a second input signal to the first differential amplification circuitry,
wherein an output of the first differential amplification circuitry is received as an input to the first high pass filter and gain adjustment circuitry,
wherein an output of the first high pass filter and gain adjustment circuitry is received as an input to the first low pass filter circuitry,
wherein an output of the first low pass filter circuitry is received as an input to the first digitization circuitry, and
wherein an output of the first digitization circuitry comprises the first in ear signal.

17. The method of claim 16, further comprising:
generating, by a third electrode provided on the female component and disposed against a second surface of the ear canal of the patient, a second ear canal signal;
receiving, with electronic circuitry, the second ear canal signal,
generating, with the electronic circuitry, a second in ear signal by referencing the concha signal to the second ear canal signal;
generating, with the electronic circuitry, the ear EEG signal by selecting between the first in ear signal and the second in ear signal with the electronic circuitry;
wherein the electronic circuitry further includes at least second differential amplification circuitry, second high pass and gain adjustment circuitry, second low pass filter circuitry, and second digitization circuitry,
wherein the second ear canal signal is received as a reference input signal to the second differential amplification circuitry and the concha signal is received as a second input signal to the second differential amplification circuitry,
wherein an output of the second differential amplification circuitry is received as an input to the second high pass filter and gain adjustment circuitry,
wherein an output of the second high pass filter and gain adjustment circuitry is received as an input to the second low pass filter circuitry,
wherein an output of the second low pass filter circuitry is received as an input to the second digitization circuitry, and
wherein an output of the second digitization circuitry comprises the second in ear signal.

18. The method of claim 17, further comprising:
implementing, with the electronic circuitry, a quality switching algorithm;
determining, with the electronic circuitry, which of the first in ear signal and the second in ear signal is of higher quality; and
transmitting, with the electronic circuitry, whichever of the first in ear signal and the second in ear signal is of higher quality as the ear EEG signal.

* * * * *